United States Patent
Amako et al.

[11] Patent Number: 5,845,848
[45] Date of Patent: Dec. 8, 1998

[54] DEICER

[75] Inventors: Kiyoo Amako; Makoto Mizuno, both of Tokyo, Japan

[73] Assignee: STS Corporation, Japan

[21] Appl. No.: 887,438

[22] Filed: Jul. 2, 1997

[30] Foreign Application Priority Data

Oct. 9, 1996 [JP] Japan .................................. 8-285882

[51] Int. Cl.[6] .............................. B05B 1/24; B64D 15/10
[52] U.S. Cl. ...................... 239/129; 239/135; 244/134 R; 244/134 C
[58] Field of Search ................................. 239/129, 135; 244/134 R, 134 C

[56] References Cited

U.S. PATENT DOCUMENTS

| | | | |
|---|---|---|---|
| 4,073,437 | 2/1978 | Thorton-Trump | 239/131 |
| 4,832,262 | 5/1989 | Robertson | 239/129 |
| 4,872,501 | 10/1989 | Hightower | 239/135 X |
| 5,242,133 | 9/1993 | Zwick | 244/134 C |
| 5,244,168 | 9/1993 | Williams | 244/134 R |
| 5,318,254 | 6/1994 | Shaw et al. | 244/134 C |
| 5,558,303 | 9/1996 | Koethe et al. | 244/134 R |

*Primary Examiner*—Lesley D. Morris
*Attorney, Agent, or Firm*—Bachman & LaPointe, P.C.

[57] ABSTRACT

A deicer includes a water tank storing water and an antifreeze solution tank storing an antifreeze solution. The water tank and the antifreeze solution tank are provided with heat exchangers, respectively. Pumps are further provided for feeding the water and the antifreeze solution in the respective tanks to a spray nozzle for spraying out a mixture of the water and the antifreeze solution. A gas turbine is provided for driving the foregoing pumps. Exhaust gas of the gas turbine is introduced into the heat exchangers through a control of valve switching so as to hold temperatures of the water and the antifreeze solution in the respective tanks to be constant. Further, bleed air of the gas turbine is fed to an air nozzle so as to be jetted out therefrom.

3 Claims, 9 Drawing Sheets

DEICER

BACKGROUND OF THE INVENTION

1. Field of the Invention

The present invention relates to a deicing apparatus or a deicer for spreading or spraying a deicing liquid on the snow and/or the ice attached to an object, such as an airplane, so as to remove it.

2. Description of the Prior Art

When the snow/ice is attached to the surfaces of airfoils and body of the airplane before takeoff due to snowfall or the like in winter, the lift required for takeoff is not obtained to a sufficient level so that the airplane can not take off. In order to cope with this problem, a method has been taken, wherein necessary mechanical equipments are loaded on a vehicle for exclusive use in deicing (hereinafter referred to as "deicer vehicle") for spraying a deicing liquid from a spray nozzle so as to melt the snow/ice on the surfaces of airfoils and body of the airplane. The deicing liquid is a mixture of water and an antifreeze solution which are heated to a given constant temperature. There have been available ethylene glycol based antifreeze solutions (type 1 ADF), propylene glycol based antifreeze solutions (type 2 ADF) and others.

However, since those deicing liquids each cause an undesirable environmental influence on regions around an airport, it has been a serious problem how to reduce the amount of deicing liquid to be used.

For solving this problem, a method has been taken, wherein a blower is installed on the deicer vehicle for ejecting or jetting the air onto the snow/ice on the airplane so as to blow it off onto the ground, and then, the deicing liquid is sprayed onto the remaining snow/ice on the airplane for melting and removing it. According to this method, since the snow/ice is largely blown off before spraying the deicing liquid, the spray amount of deicing liquid becomes less than one third as compared with the former method. Further, a deicing operation time is also shortened as compared with the former method.

Figure 7A:
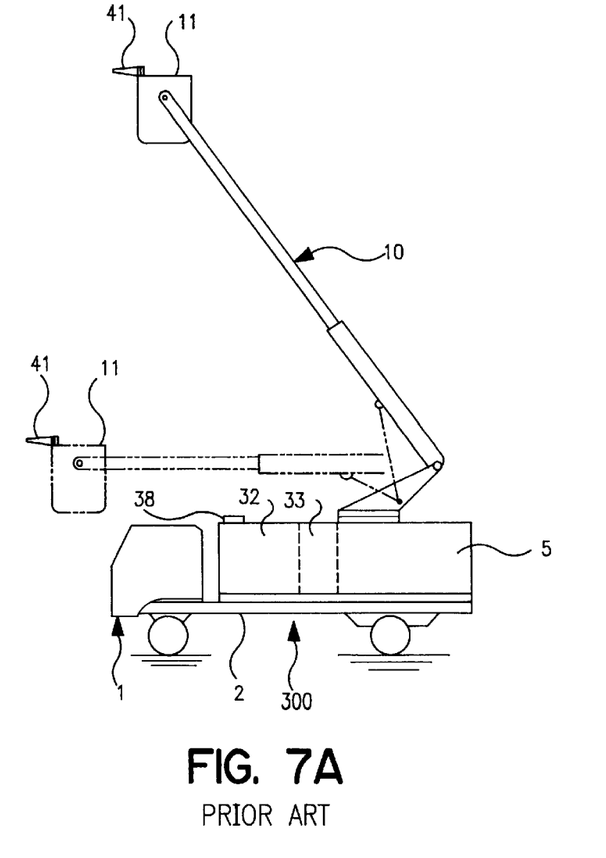
FIG. 7A is a right-side view of a conventional deicer vehicle.
Figure 7B:
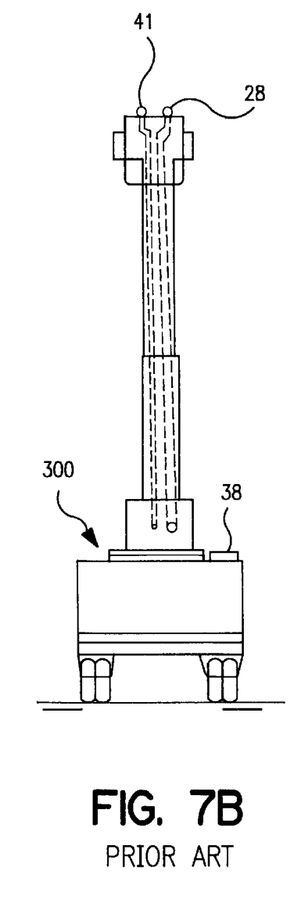
FIG. 7B is a rear view of the conventional deicer vehicle shown in FIG. 7A.
Figure 8:
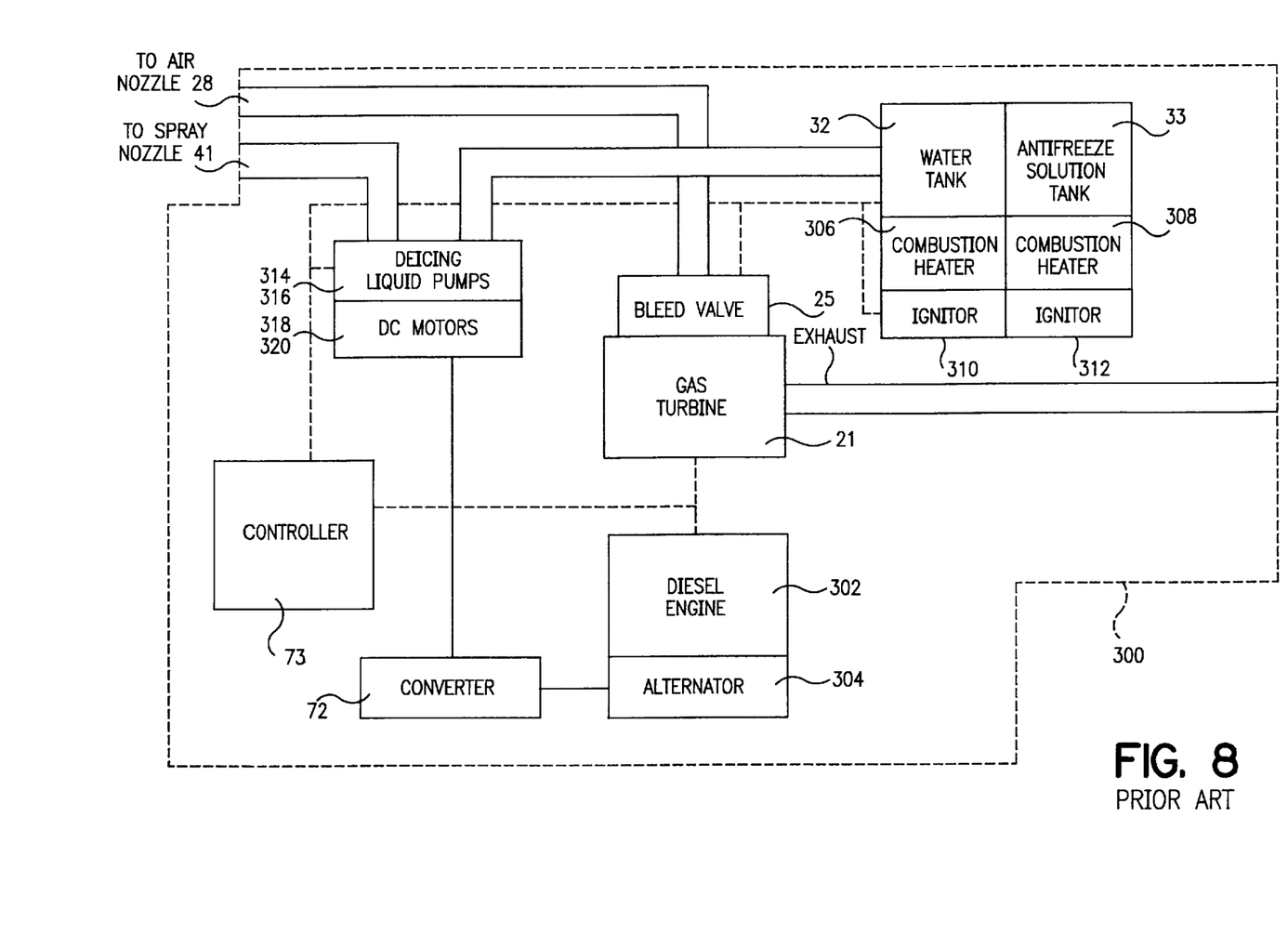
FIG. 8 is a block diagram showing a basic structure of a conventional deicer installed on the deicer vehicle shown in FIGS. 7A and 7B.
Figure 9:
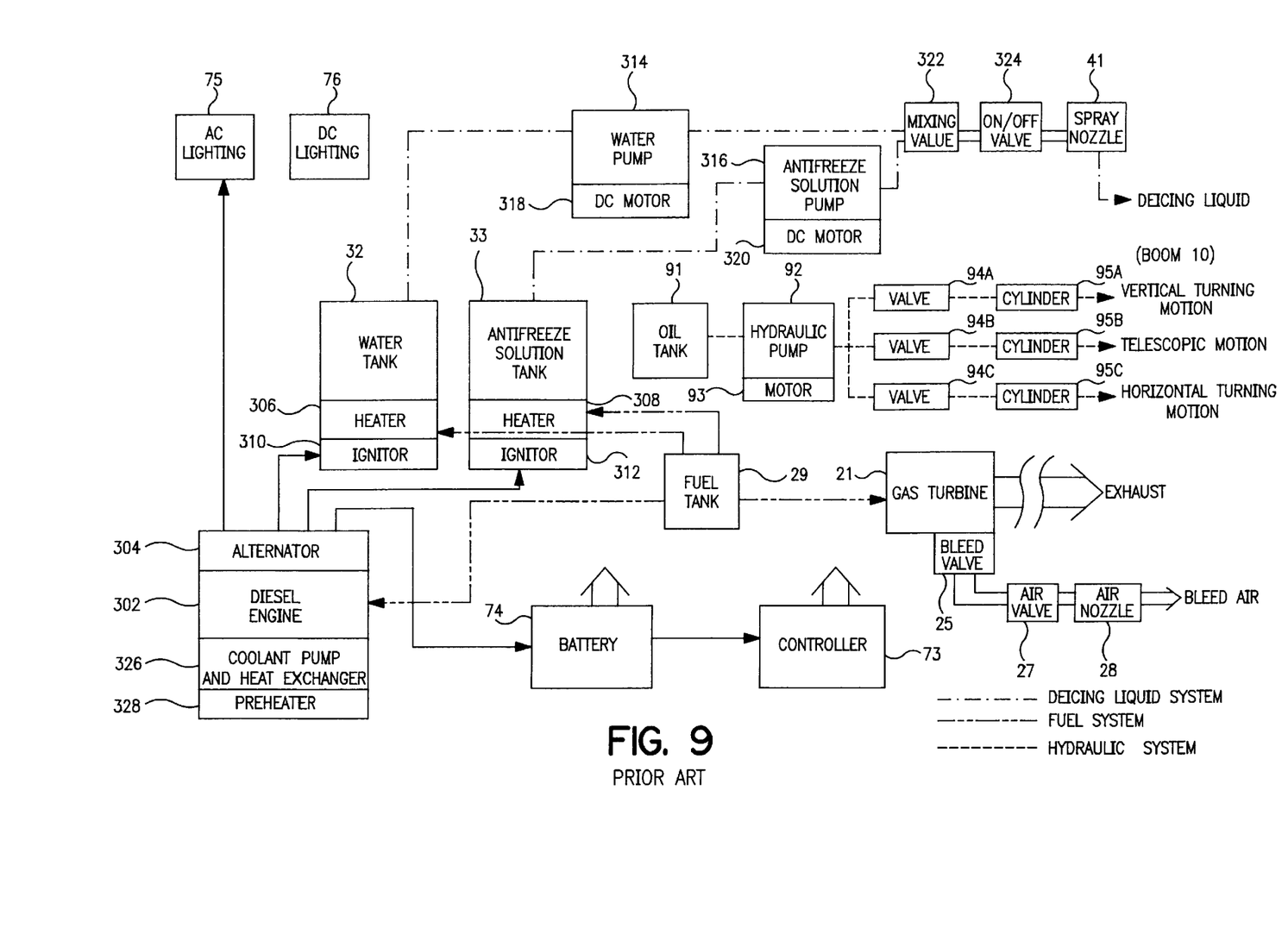
FIG. 9 is a block diagram for explaining various systems of the conventional deicer shown in FIG. 8.

FIGS. 7A and 7B show a deicer vehicle used in the latter method, FIG. 8 shows a basic structure of a deicing apparatus or a deicer installed on the deicer vehicle shown in FIGS. 7A and 7B, and FIG. 9 shows various systems of the deicer shown in FIG. 8.

As shown in FIGS. 7A and 7B, the deicer vehicle 1 includes the deicer 300 installed on a chassis 2 thereof. The deicer 300 includes a water tank 32 storing water, an antifreeze solution tank 33 storing an undilute antifreeze solution, and various components arranged in a container 5. The deicer 300 further includes a boom 10 installed on the container 5 and having a basket (high-altitude work bench) 11 at its tip. The boom 10 is capable of telescopic motions, horizontal turning motions and vertical turning motions so that the basket 11 can be located at a desired position where a worker operates a variable air nozzle 28 provided at the basket 11 to jet out the compressed air onto the snow/ice on the airplane, and then operates a variable spray nozzle 41 provided at the basket 11 to spray the deicing liquid onto the snow/ice remaining on the airplane. In FIGS. 7A and 7B, numeral 38 denotes an exhaust duct for a gas turbine 21 (see FIG. 8).

As appreciated from FIGS. 8 and 9, the deicer 300 has a hydraulic system for achieving the foregoing motions of the boom 10, a deicing liquid system for spraying the deicing liquid from the spray nozzle 41, an air system for ejecting the compressed air from the air nozzle 28, and a fuel system for feeding fuel, such as heavy oil, from a fuel tank 29 to a diesel engine 302, the gas turbine 21 and combustion heaters 306 and 308.

In the deicing liquid system, the water in the water tank 32 and the antifreeze solution in the antifreeze solution tank 33 are heated to and held at a given temperature, for example, 85° C., by the combustion heaters 306 and 308, respectively, and then transferred under pressure by deicing liquid pumps, i.e. a water pump 314 and an antifreeze solution pump 316, to a mixing valve 322 where they are mixed to be the deicing liquid, which is then discharged from the spray nozzle 41 via an ON/OFF solenoid valve 324. Thus, for heating the water and the antifreeze solution, the combustion heaters 306 and 308 as well as fuel ignitors 310 and 312 are necessary, respectively. Further, for operating the ignitors 310 and 312, an ac generator or an alternator 304 driven by the diesel engine 302 is necessary. Further, for driving the water pump 314 and the antifreeze solution pump 316, large-sized dc motors 318 and 320 are necessary.

The air system includes the gas turbine 21 whose bleed air is fed to the air nozzle 28 via a bleed valve 25 and an ON/OFF air valve 27 so as to be jetted out from the air nozzle 28.

The total operations of the deicer 300 are controlled by a controller 73. The controller 73 is fed with the electric power from a battery 74 which charges from the alternator 304 via a converter 72. The battery 74 feeds the electric power to all dc operated components.

In FIG. 9, numeral 326 denotes an engine coolant (cooling water) pump and a heat exchanger for the diesel engine 302, and numeral 328 denotes a preheater for the diesel engine 302.

The deicer 300 has the following disadvantages:

(1) For holding the water and the antifreeze solution at the given constant temperature, the large-capacity heaters and the ignitors are necessary. Further, for operating the ignitors, the generator driven by the diesel engine is necessary.

(2) For spraying the deicing liquid, the large-sized liquid pumps integral with the motors are necessary.

(3) Since the large-sized components, such as the heaters, the ignitors, the alternator, the diesel engine for driving the alternator, and the liquid pumps with the motors, are required to be arranged in the deicer, a problem is raised in view of weight and size. Specifically, if the deicing liquid is required more than a certain amount, the deicer vehicle tends to increase so much in weight and size, while, if the deicer vehicle is required to be reduced in weight and size, the loadable amount of deicing liquid tends to be insufficient.

(4) The temperatures of the water and the antifreeze solution are controlled to be constant by adjusting the amounts of fuel fed to the combustion heaters. The control for this is complicated so that the reliability of the control tends to be low.

SUMMARY OF THE INVENTION

Therefore, it is an object of the present invention to provide an improved deicer.

According to one aspect of the present invention, a deicer having a first tank storing water and a second tank storing an antifreeze solution and discharging a mixture of the water in the first tank and the antifreeze solution in the second tank, comprises heat exchangers provided at the first and second tanks, respectively; pumps for feeding the water in the first tank and the antifreeze solution in the second tank to a discharge nozzle so as to be discharged from the discharge nozzle as said mixture; a gas turbine for driving the pumps;

a switching valve for allowing or disabling introduction of exhaust gas of the gas turbine into the heat exchangers; and a controller for controlling a switching operation of the switching valve to control the introduction of the exhaust gas into the heat exchangers so as to control temperatures of the water in the first tank and the antifreeze solution in the second tank.

According to another aspect of the present invention, a deicer having a first tank storing water and a second tank storing an antifreeze solution and discharging a mixture of the water in the first tank and the antifreeze solution in the second tank, comprises heat exchangers provided at the first and second tanks, respectively; pumps for feeding the water in the first tank and the antifreeze solution in the second tank to a discharge nozzle so as to be discharged from the discharge nozzle as said mixture; a gas turbine for driving the pumps; a switching valve for allowing or disabling introduction of exhaust gas of the gas turbine into the heat exchangers; a bleed valve for bleeding air from the gas turbine; an air nozzle for ejecting the bleed air of the gas turbine fed from the bleed valve through a duct; and a controller for controlling a switching operation of the switching valve to control the introduction of the exhaust gas into the heat exchangers so as to control temperatures of the water in the first tank and the antifreeze solution in the second tank, the controller further controlling an open/close operation of the bleed valve so as to control ejection of the bleed air from the air nozzle.

According to another aspect of the present invention, a deicer having a first tank storing water and a second tank storing an antifreeze solution and discharging a mixture of the water in the first tank and the antifreeze solution in the second tank, comprises heat exchangers provided at the first and second tanks, respectively; pumps for feeding the water in the first tank and the antifreeze solution in the second tank to a discharge nozzle so as to be discharged from the discharge nozzle as the mixture; a gas turbine for driving the pumps; a switching valve for allowing or disabling introduction of exhaust gas of the gas turbine into the heat exchangers; a bleed valve for bleeding air from the gas turbine; an air nozzle for ejecting the bleed air of the gas turbine fed from the bleed valve through a duct; a controller for controlling a switching operation of the switching valve to control the introduction of the exhaust gas into the heat exchangers so as to control temperatures of the water in said first tank and the antifreeze solution in the second tank, the controller further controlling an open/close operation of the bleed valve so as to control ejection of the bleed air from the air nozzle; and an alternator driven by the gas turbine.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to FIGS. 1 to 6. In these figures, the same or like components as those in FIGS. 7A to 9 are represented by the same signs or symbols for brevity of disclosure.

(1) Basic Structure

Figure 1:
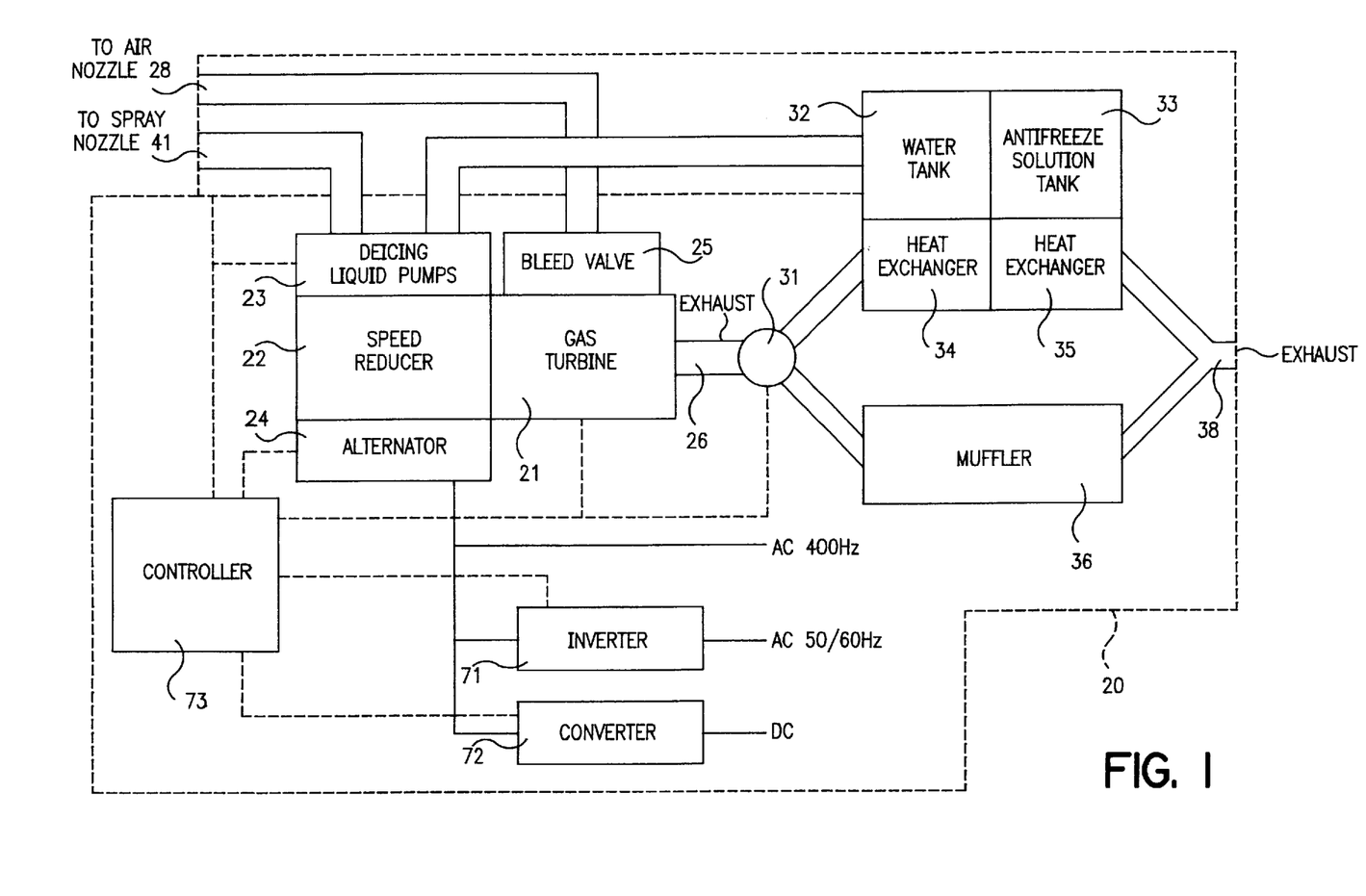
FIG. 1 is a block diagram showing a basic structure of a deicer according to a preferred embodiment of the present invention.

FIG. 1 shows a basic structure of a deicer 20 according to the preferred embodiment of the present invention. In the deicer 20, the bleed air of a gas turbine 21 is ejected from a variable air nozzle 28 for blowing off the snow/ice attached to the airplane as in the foregoing prior art, while the exhaust gas of the gas turbine 21, whose temperature is about 600° C., is used for heating water in a water tank 32 and an antifreeze solution in an antifreeze solution tank 33.

Further, the gas turbine 21 drives deicing liquid pumps 23, i.e. a variable delivery water pump 23A and a variable delivery antifreeze solution pump 23B (see FIG. 3), via a speed reducer 22, and further drives an ac generator or an alternator 24 via the speed reducer 22.

The bleed air is directly supplied from a compressor 21A (see FIG. 3) of the gas turbine 21 to the air nozzle 28 via a bleed valve 25.

The deicing liquid pumps 23 pump up the water (hot water) and the antifreeze solution, which are heated by a water tank heat exchanger 34 and an antifreeze solution tank heat exchanger 35, from the water tank 32 and the antifreeze solution tank 33, respectively. The pumped-up water and antifreeze solution are then mixed to be the deicing liquid, which is then sprayed out from a variable spay nozzle 41.

The exhaust gas of the gas turbine 21 is introduced into the heat exchangers 34 and 35 or an exhaust gas muffler 36 via an exhaust duct 26 and a three-way valve 31. The heat exchangers 34 and 35 are integral with the corresponding tanks 32 and 33, respectively, so that the water and the antifreeze solution are heated when the exhaust gas is introduced thereinto. Upon completion of heating, the exhaust gas is conducted to the muffler 36 for preventing the temperatures of the water and the antifreeze solution from excessively increasing. Thereafter, switching of the three-way valve 31 is controlled so as to hold the temperatures of the water and the antifreeze solution at a given constant value. The switching control of the three-way valve 31 is performed by a controller 73, which will be described later.

For achieving reduction in weight and size, a high-speed input 400 Hz generator is used for the alternator 24. Depending on necessity, portions of the output of the alternator 24 are converted to commercial ac 50~60 Hz via an inverter 71 and to dc via a converter 72 for proper use inside and outside the deicer 20.

The controller 73 performs controls of the total operations of the deicer 20, such as, the controls of activation and deactivation of various components, the control of operation of the gas turbine 21, the foregoing switching control of the three-way valve 31 and the open/close control of the bleed valve 25.

According to this preferred embodiment, the layout of the tanks 32 and 33 and the container 5 on the chassis 2 of the deicer vehicle 1 differs from that of the foregoing prior art. Specifically, in this preferred embodiment, the space occupied by the container 5 is largely reduced. Thus, if the volumes of the tanks 32 and 33 are equal to those of the prior art, the deicer vehicle can be reduced in weight and size. On the other hand, if the size of the deicer vehicle remains unchanged, the volumes of the tanks 32 and 33 can be increased so as to enhance the deicing capability.

Hereinbelow, the layout in this preferred embodiment will be described in detail.

Figure 2A:
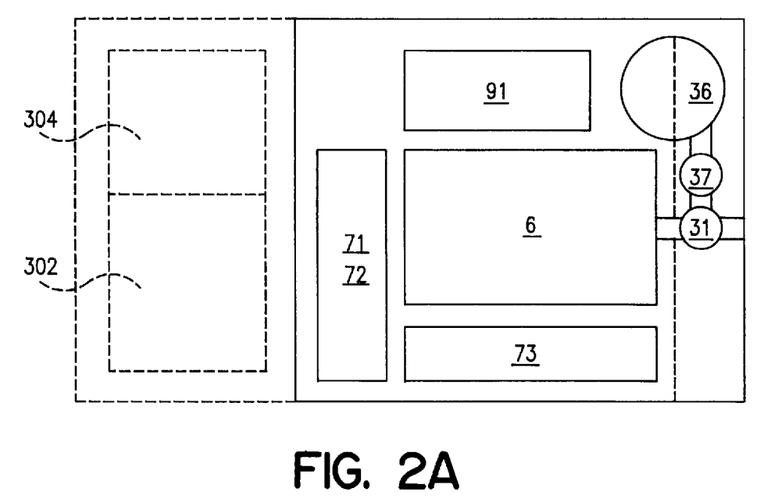
FIG. 2A is a plan view for explaining an arrangement of components in a container of the deicer shown in FIG. 1 as compared with a conventional arrangement.
Figure 2B:
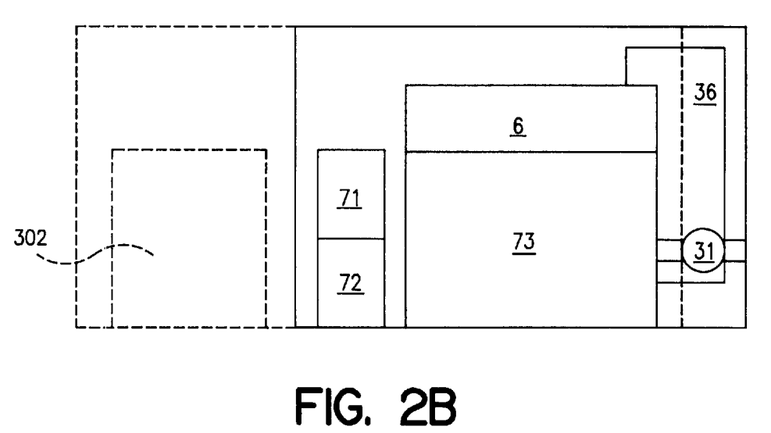
FIG. 2B is a side view of the arrangement shown in FIG. 2A.

FIGS. 2A and 2B show arrangements of the components in the container 5, wherein the solid lines represent an arrangement according to this preferred embodiment and the broken lines represent an arrangement according to the prior art. As appreciated, the alternator 304 exists as an independent unit, as opposed to the alternator 24 which exists as attaching to the gas turbine 21.

According to this preferred embodiment, the components, such as a gas turbine cubicle 6 accommodating therein the gas turbine 21, the deicing liquid pumps 23, the alternator 24 and others for noise reduction and heat shield, the three-way valve 31, a three-way valve 37, the muffler 36, the inverter 71, the converter 72, the controller 73 and the oil tank 91, are arranged in the container 5 as shown by the solid lines in FIG. 2.

On the other hand, in the prior art, although the muffler 36, the inverter 71 and the three-way valves 31 and 37 are not required, the other components are necessary and, in addition, the commercial 50 Hz/60 Hz alternator 304 and the diesel engine 302 for driving it, which are both large and heavy, are necessary.

As described above, according to this preferred embodiment, since some components are omitted and some components are replaced with smaller ones, a length of the container 5 is reduced by about 35%. Since a width and a height remain unchanged, the volume is also reduced by about 35%.

(2) Detailed Structure

Figure 3:
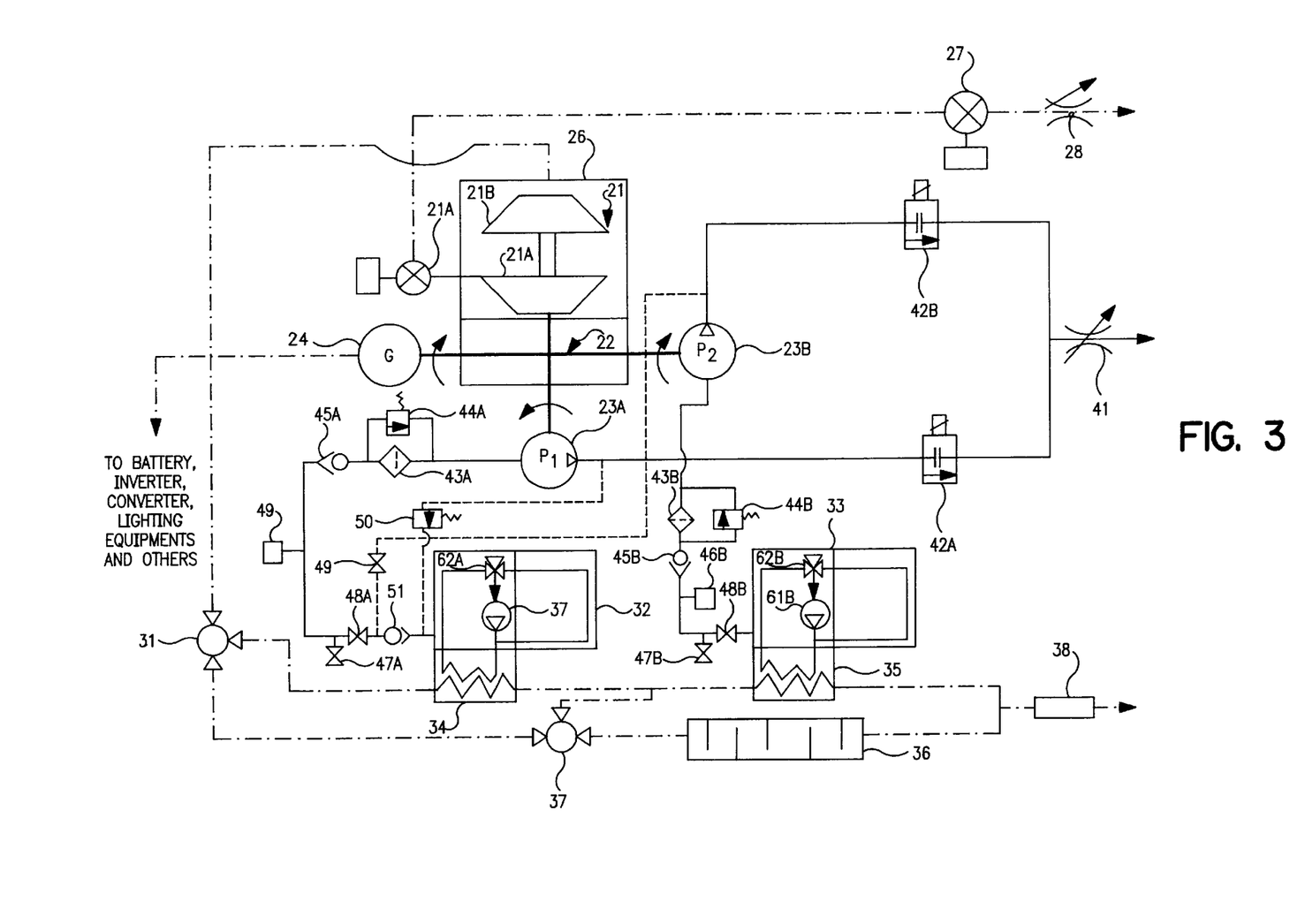
FIG. 3 is a diagram showing a detailed structure of the deicer shown in FIG. 1.

FIG. 3 shows a detailed structure of the deicer 20.

(2-1) Whole Structure

The deicer 20 includes the gas turbine 21, the speed reducer 22 and the auxiliary components (the pumps 23A and 23B and the alternator 24) driven by the gas turbine 21 via the speed reducer 22.

The structure for air bleed includes the bleed valve 25 provided near a bleed duct and a bleed port of the compressor 21A of the gas turbine 21.

The structure for heating the water and the antifreeze solution and holding the temperatures of the heated water and antifreeze solution includes an exhaust gas passage for introducing the exhaust gas of a turbine 21B to the exhaust duct 38 passing through the heat exchangers 34 and 35 or the muffler 36 via the three-way valves 31 and 37.

The deicer 20 further includes various fluid circuit components provided near the pumps 23A and 23B on the fluid circuit for conducting the heated water and antifreeze solution and discharging the deicing liquid from the spray nozzle 41. The deicer 20 further includes the inverter 71, the converter 72, the controller 73 and others.

Most of the foregoing components are arranged in the container 5 shown in FIG. 7A.

As appreciated from FIG. 7A, the air nozzle 28, the exhaust duct 38 and the spray nozzle 41 are arranged outside the container 5. Further, the water tank 32, the antifreeze solution tank 33 and the heat exchangers 34 and 35 are also arranged outside the container 5.

The deicing liquid may include the antifreeze solution of either the type 1 ADF or the type 2 ADF.

(2-2) Blowing Function

As shown in FIG. 3, the deicer 20 has a blowing function. Specifically, the bleed air taken out from the bleed port of the gas turbine compressor 21A is ejected from the air nozzle 28 via the bleed valve 25 and the ON/OFF air valve 27.

In general, the bleed air ejection is performed before the deicing liquid spraying. On the other hand, the bleed air ejection can be performed approximately at the same time with the deicing liquid spraying. By blowing off the snow/ice on the surfaces of airfoils and body of the airplane in advance, the spray amount of deicing liquid can be minimized.

(2-3) Deicing Liquid Spray Circuit

As shown in FIG. 3, the water is sucked from the tank 32 by the pump 23A and sent toward the spray nozzle 41. On the other hand, the undilute antifreeze solution is sucked from the tank 33 by the pump 23B and sent toward the spray nozzle 41. Since the pumps 23A and 23B each are of a variable delivery type, their deliveries can be independently controlled so that the mixing ratio therebetween can be adjusted to a desired value.

A purge valve 49 is provided for removing the mixture of the water and the antifreeze solution from the spray circuit when the deicer 20 is not in operation. A relief valve 50 is provided for returning the water in the spray circuit into the water tank 32 when the boom 10 is contracted to shorten the spray circuit.

(2-4) Heating of Deicing Liquid

As shown in FIG. 3, the deicer 20 includes the water tank 32 and the antifreeze solution tank 33 which are provided with the heat exchangers 34 and 35, respectively. Heat exchange is performed between the water and the antifreeze solution in the respective tanks 32 and 33 and the exhaust gas of the gas turbine 21 via the heat exchangers 34 and 35 so that the water and the antifreeze solution are heated to and held at a given constant temperature, for example, 85° C.

Each of the tanks 32 and 33 is divided into two chambers and provided with an in-tank circulation pump 61A, 61B and a three-way valve 62A, 62B in an in-tank circulating circuit.

Since the temperature of the exhaust gas of the gas turbine 21 is about 600° C. under the maximum rated load, a difference in heat exchange temperature between the turbine exhaust gas and the respective tanks 32 and 33 is more than 600° C. when the temperatures of the tanks are less than 0° C. upon snowfall or the like. Thus, if the high-temperature exhaust gas is first introduced into the heat exchanger 35 of the antifreeze solution tank 33, the antifreeze solution may be deteriorated in quality. In view of this, it is preferable to first introduce the exhaust gas into the heat exchanger 34 to heat the water and then introduce the exhaust gas, which has been lowered in temperature, into the heat exchanger 35 to heat the antifreeze solution.

By controlling switching operations of the three-way valves 31 and 37, the exhaust gas is selectively introduced into the heat exchangers 34 and 35 (not into the muffler 36), or into the heat exchanger 35 bypassing the heat exchanger 34 (not into the muffler 36), or into the muffler 36 (not into the heat exchangers 34 and 35).

Since the tanks 32 and 33 are both required to be heated to and held at a given constant temperature, after the water in the water tank 32 is heated to the given temperature, the three-way valves 31 and 37 are switched to introduce the exhaust gas into the heat exchanger 35 bypassing the heat exchanger 34. Through this operation, the antifreeze solution in the tank 33 can be heated to the given temperature equal to that of the water.

In FIG. 3, 42A and 42B denote ON/OFF solenoid valves, respectively, 43A and 43B denote filters, respectively, 44A and 44B denote relief valves, respectively, 45A and 45B denote check valves, respectively, 46A and 46B denote flowmeters, respectively, 47A and 47B denote drain valves, respectively, 48A and 48B denote valves, respectively, and 51 denotes a check valve.

(2-5) Temperature Control of Deicing Liquid

A method of controlling the temperature of the deicing liquid will be explained, wherein the temperature of one of the water and the antifreeze solution is controlled. As appreciated, this liquid temperature control method is applicable to a case where plural kinds of liquids are controlled in temperature, by providing a bypass passage and controlling switching operations of switching valves as described above.

Figure 4:
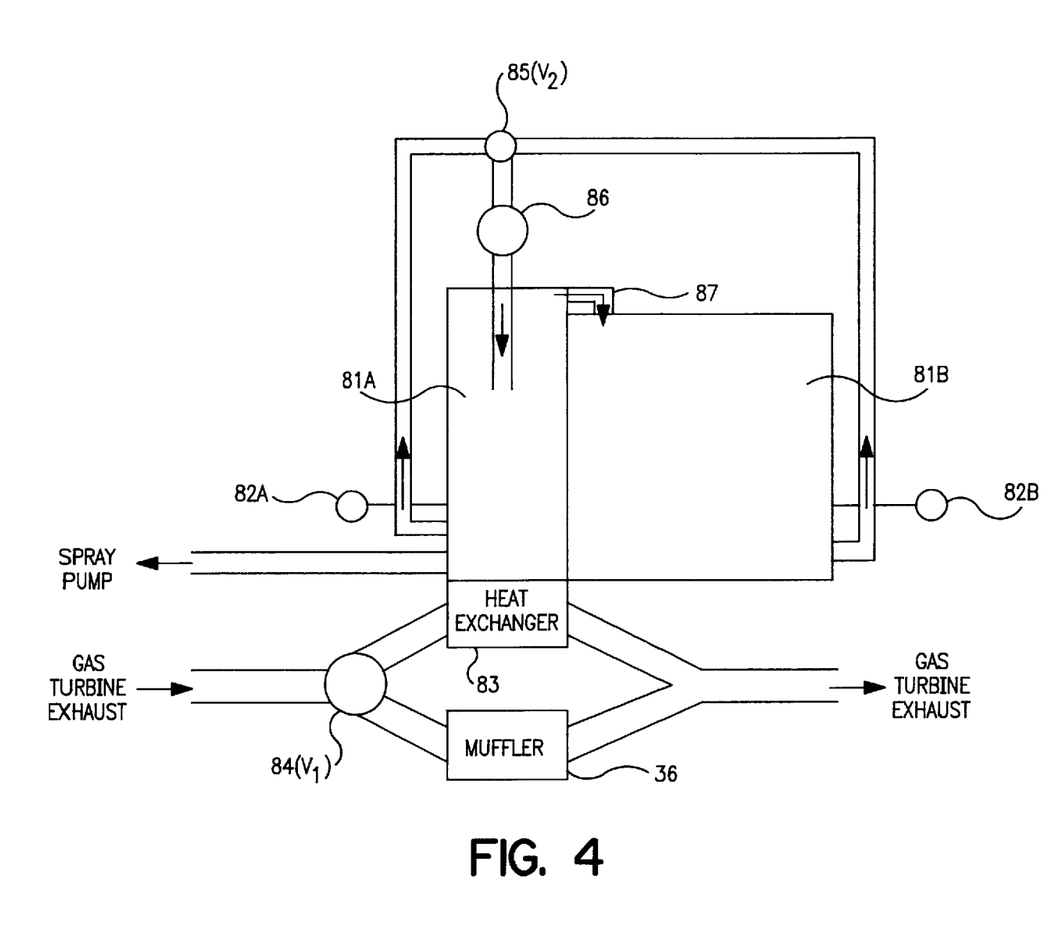
FIG. 4 is a diagram showing a structure of a liquid temperature control system according to the preferred embodiment of the present invention.
Figure 5:
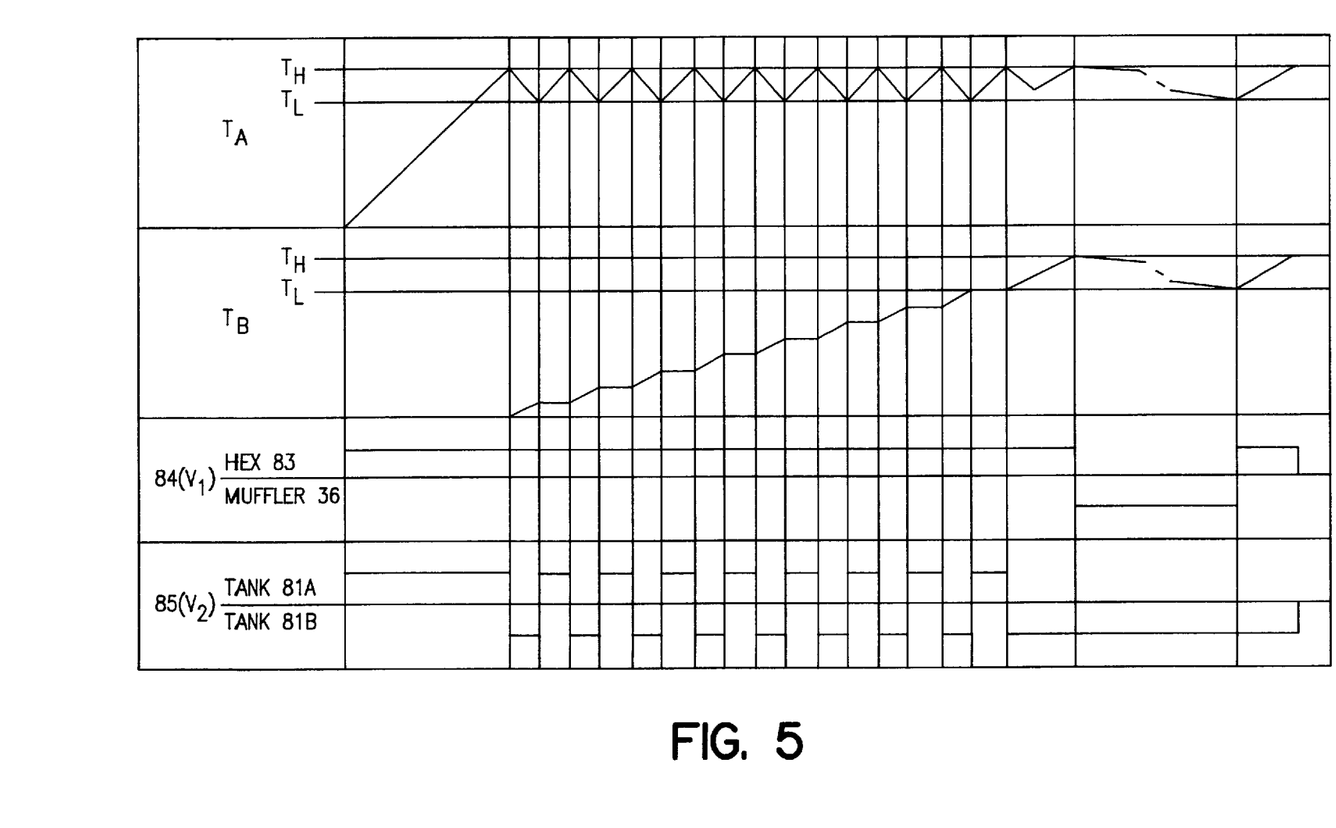
FIG. 5 is a diagram for explaining a liquid temperature control method according to the preferred embodiment of the present invention.

FIG. 4 shows a structure of a liquid temperature control system and FIG. 5 shows transitions of liquid temperatures and corresponding open/close states of valves.

In this method, a tank is divided into a tank 81A directly heated by a heat exchanger 83 and a tank 81B not directly heated by the heat exchanger 83. By switching a three-way valve 85(V2) to the tank 81A or 81B, circulation of the liquid in the tank 81A or circulation of the liquid through the tanks 81A and 81B can be achieved by means of a circulation pump 86.

When the liquid temperature is low, a switching valve 84(V1) is switched to the heat exchanger 83 for introducing the exhaust gas of the gas turbine into the heat exchanger 83 so as to heat the liquid in the tank 81A. Upon heating, the three-way valve 85(V2) is switched to the tank 81A so that the circulation of the liquid only in the tank 81A is performed via the circulation pump 86.

If the liquid temperature control range is set between $T_L$ and $T_H$ ($T_H > T_L$), when a monitored value $T_A$ of a liquid temperature sensor 82A for the tank 81A reaches $T_H$, the three-way valve 85(V2) is switched to the tank 81B so as to introduce the liquid in the tank 81B into the tank 81A. An excess amount is returned to the tank 81B via an overflow pipe 87.

When $T_A$ is lowered to $T_L$, the three-way valve 85(V2) is switched to the tank 81A to perform circulation and heating of the liquid in the tank 81A.

The foregoing operations are repeated until a monitored value $T_B$ of a liquid temperature sensor 82B reaches $T_L$. After $T_B$ reaches $T_L$, the three-way valve 85(V2) is switched to the tank 81B so as to perform heating of the whole liquid until $T_A$ and $T_B$ both reach $T_H$. When $T_A$ and $T_B$ both reach $T_H$, the switching valve 84(V1) is switched to the muffler 36 to prohibit the exhaust gas from flowing into the heat exchanger 83 so that heating of the liquid is not performed. When $T_A$ and $T_B$ are both lowered to $T_L$, the switching valve 84(V1) is switched to the heat exchanger 83 to introduce the exhaust gas into the heat exchanger 83 so as to heat the liquid.

(3) Systems

Figure 6:
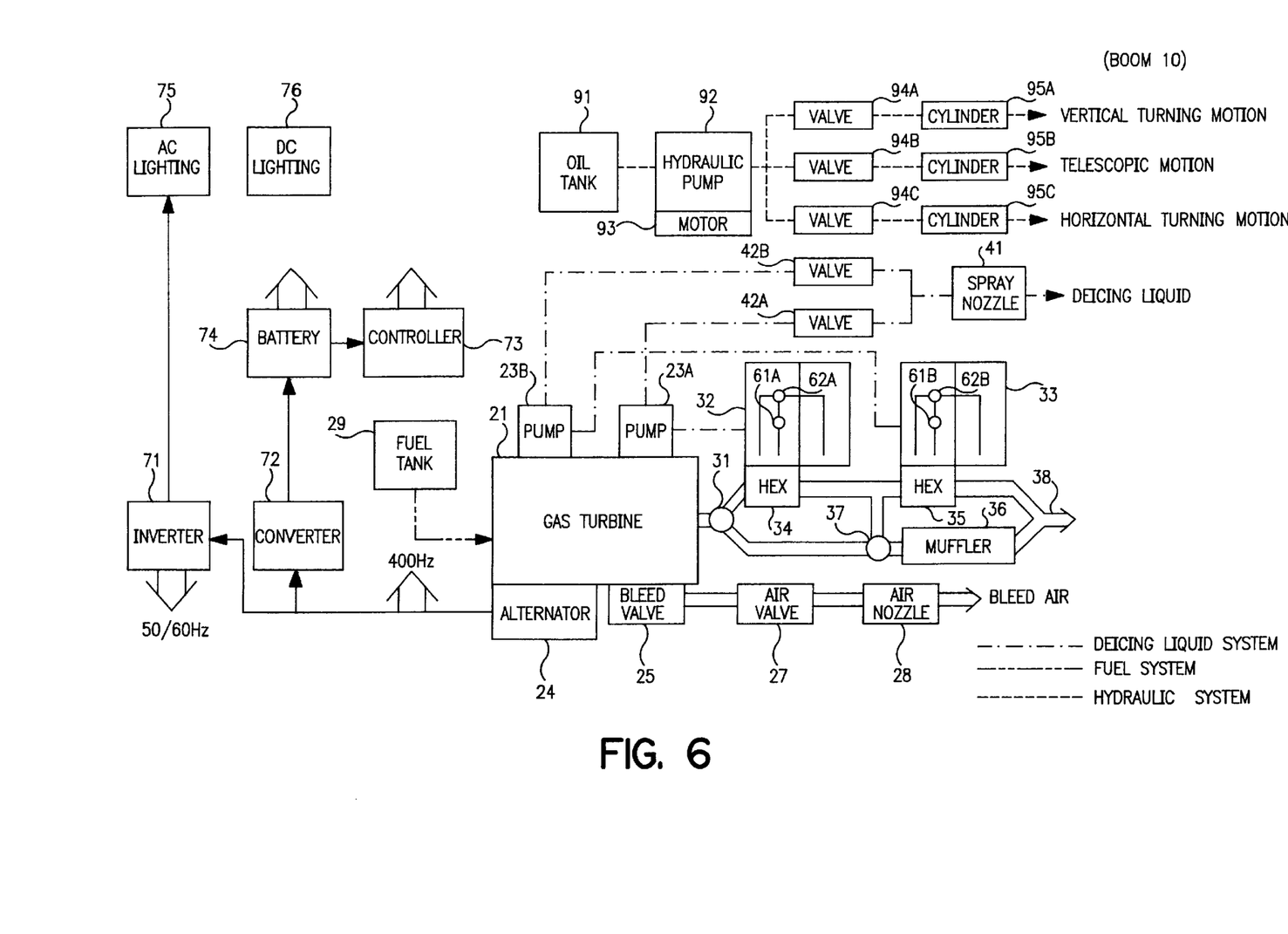
FIG. 6 is a block diagram for explaining various systems of the deicer shown in FIG. 1.

FIG. 6 shows various systems of the deicer 20.

The gas turbine 21 feeds the bleed air to the air nozzle 28 via the bleed valve 25 and the air valve 27 and heats the water and the antifreeze solution via the heat exchangers 34 and 35 using the exhaust gas thereof. Further, the gas turbine 21 drives the pumps 23A and 23B and the alternator 24. For reduction in weight and size, the alternator 24 is of a 400 Hz output type. The output of the alternator 24 is converted into commercial ac 50 Hz/60 Hz by the inverter 71 and into dc by the converter 72.

The dc is fed to various components, such as a motor 93 for driving a hydraulic pump 92 and unload/load valves 94A to 94C provided in the hydraulic system for operating the boom 10. The commercial ac 50 Hz/60 Hz is used for ac lighting equipments and general purpose measuring instruments. Further, the ac 400 Hz, i.e. the output of the alternator 24, is used for supporting the airplane.

In FIG. 6, 91 denotes an oil tank, and 95A to 95C denote cylinders for achieving vertical turning motions, telescopic motions and horizontal turning motions of the boom 10, respectively.

As described above, according to the preferred embodiment of the present invention, in addition to using the bleed air of the gas turbine for blowing off the snow/ice, the exhaust gas of the gas turbine is also used for heating the water and the antifreeze solution. Thus, the large-capacity heaters, the ignitors and the associated power source become unnecessary. The gas turbine is further used to drive the water pump and the antifreeze solution pump so that the conventional large-sized liquid pumps integral with the motors become unnecessary. The gas turbine is further used to drive the small-sized alternator. With this arrangement, the deicer and thus the deicer vehicle can be reduced in weight and size. Further, since the temperature control of the water and the antifreeze solution is performed through the control of switching operations of the switching valves, the liquid temperature control can be performed independently of the control of operations of the gas turbine. This simplifies the control system and achieves high reliability of the control.

The present invention is not limited to a deicer only for removing the snow/ice attached to the airplane, but is also applicable to a deicer which uses only the water (without the antifreeze solution) for deicing on the roof of a building, deicing for the electric wire at the high altitude or the like.

While the present invention has been described in terms of the preferred embodiment, the invention is not to be limited thereto, but can be embodied in various ways without departing from the principle of the invention as defined in the appended claims.

What is claimed is:

1. A deicer having a first tank storing water and a second tank storing an antifreeze solution and discharging a mixture of the water in said first tank and the antifreeze solution in said second tank, said deicer comprising:

heat exchangers provided at said first and second tanks, respectively;

pumps for feeding the water in said first tank and the antifreeze solution in said second tank to a discharge nozzle so as to be discharged from said discharge nozzle as said mixture;

a gas turbine for driving said pumps;

a switching valve for allowing or disabling introduction of exhaust gas of said gas turbine into said heat exchangers; and a controller for controlling a switching operation of said switching valve to control the introduction of said exhaust gas into said heat exchangers so as to control temperatures of the water in said first tank and the antifreeze solution in said second tank.

2. A deicer having a first tank storing water and a second tank storing an antifreeze solution and discharging a mixture of the water in said first tank and the antifreeze solution in said second tank, said deicer comprising:

heat exchangers provided at said first and second tanks, respectively;

pumps for feeding the water in said first tank and the antifreeze solution in said second tank to a discharge nozzle so as to be discharged from said discharge nozzle as said mixture;

a gas turbine for driving said pumps;

a switching valve for allowing or disabling introduction of exhaust gas of said gas turbine into said heat exchangers;

a bleed valve for bleeding air from said gas turbine;

an air nozzle for ejecting the bleed air of said gas turbine fed from said bleed valve through a duct; and a controller for controlling a switching operation of said switching valve to control the introduction of said exhaust gas into said heat exchangers so as to control temperatures of the water in said first tank and the antifreeze solution in said second tank, said controller further controlling an open/close operation of said bleed valve so as to control ejection of the bleed air from said air nozzle.

3. A deicer having a first tank storing water and a second tank storing an antifreeze solution and discharging a mixture of the water in said first tank and the antifreeze solution in said second tank, said deicer comprising:

heat exchangers provided at said first and second tanks, respectively;

pumps for feeding the water in said first tank and the antifreeze solution in said second tank to a discharge nozzle so as to be discharged from said discharge nozzle as said mixture;

a gas turbine for driving said pumps;

a switching valve for allowing or disabling introduction of exhaust gas of said gas turbine into said heat exchangers;

a bleed valve for bleeding air from said gas turbine;

an air nozzle for ejecting the bleed air of said gas turbine fed from said bleed valve through a duct;

a controller for controlling a switching operation of said switching valve to control the introduction of said exhaust gas into said heat exchangers so as to control temperatures of the water in said first tank and the antifreeze solution in said second tank, said controller further controlling an open/close operation of said bleed valve so as to control ejection of the bleed air from said air nozzle; and an alternator driven by said gas turbine.

\* \* \* \* \*